Sept. 11, 1928.
E. E. CARY
COOKER
Filed Feb. 16, 1927
1,684,297
3 Sheets-Sheet 1
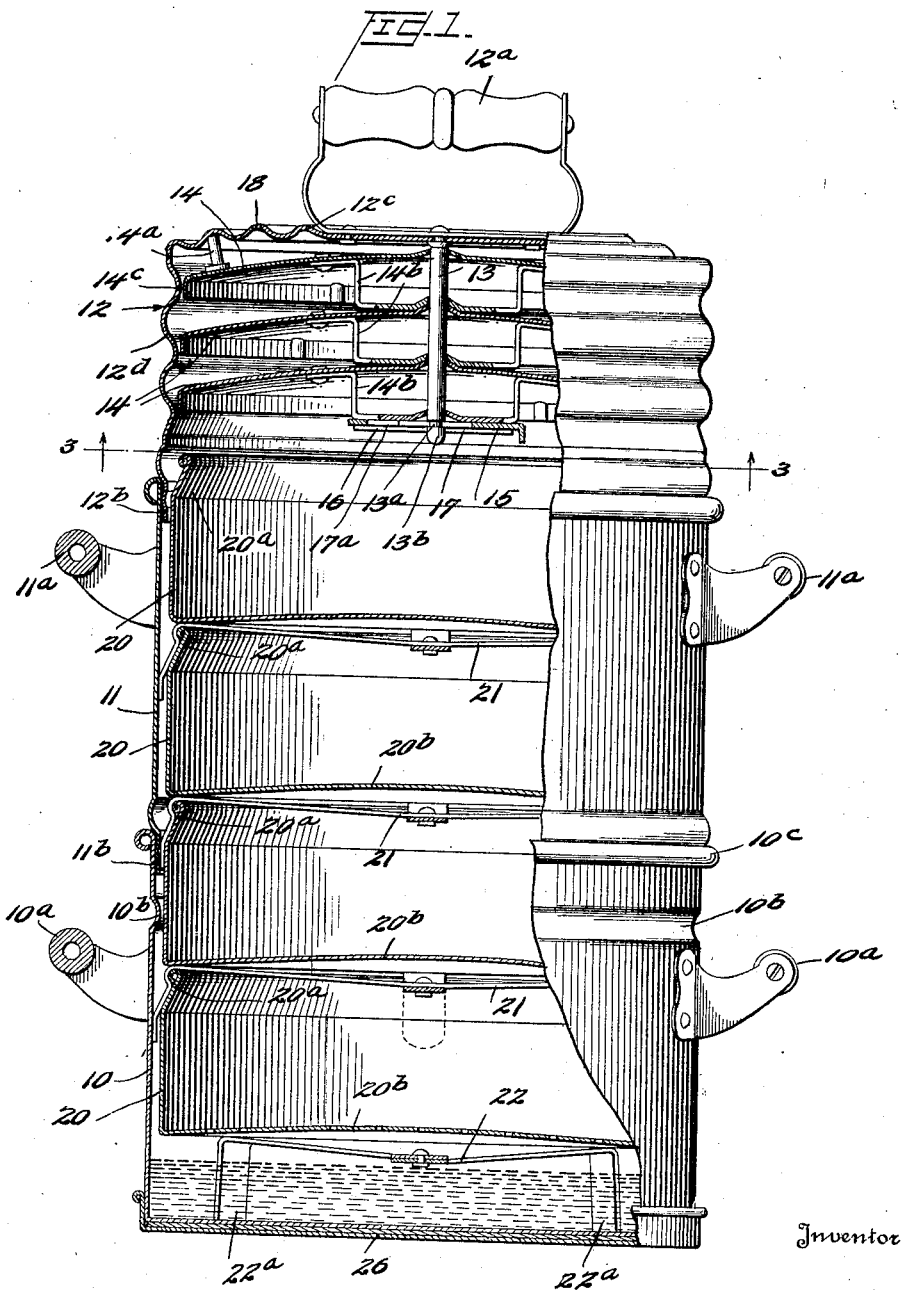

Sept. 11, 1928.
E. E. CARY
1,684,297
COOKER
Filed Feb. 16, 1927
3 Sheets-Sheet 2
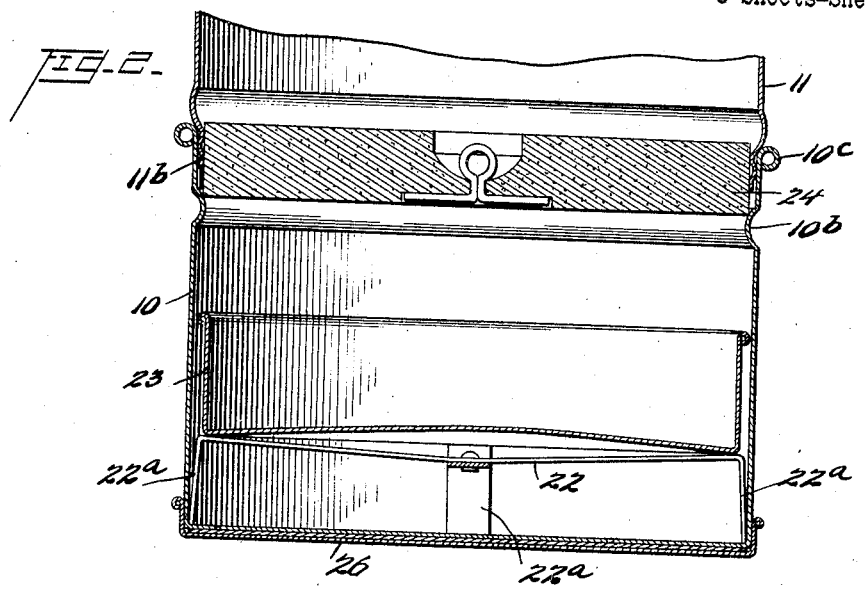
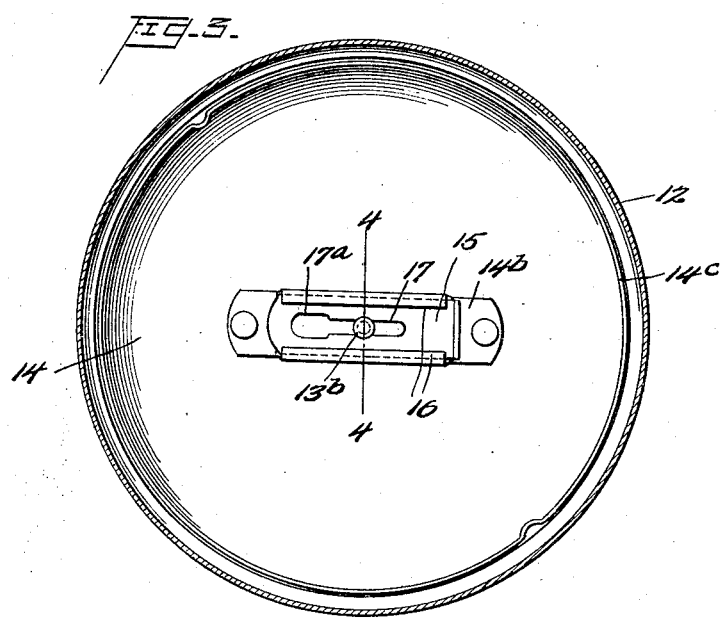
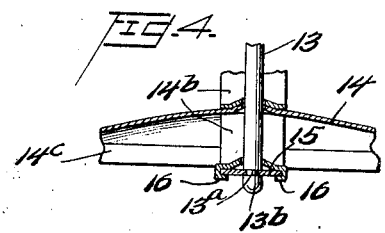
Inventor
Elmer E. Cary.
By Watson, Coit, Morse
& Grindle
Attorneys Sept. 11, 1928.
E. E. CARY
COOKER
Filed Feb. 16, 1927
1,684,297
3 Sheets-Sheet 3
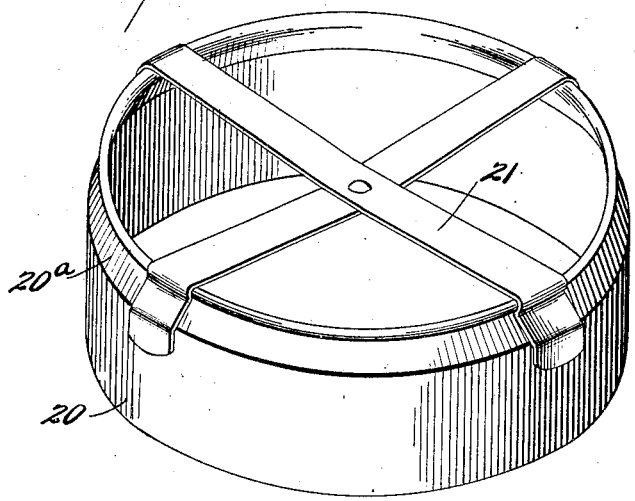
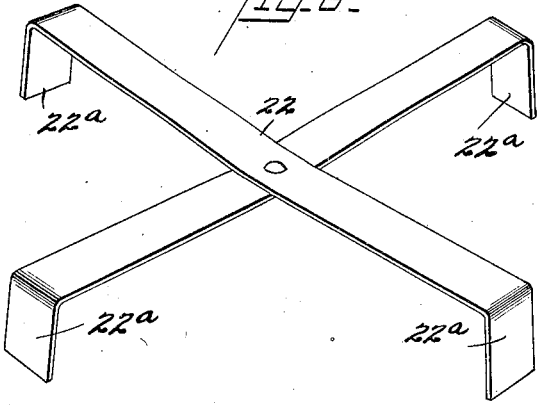
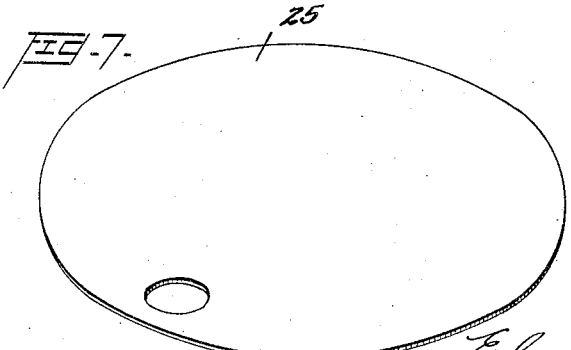
Inventor
Elmer E. Cary.
By Watson, Coit, Morse
+ Grindle
Attorney Patented Sept. 11, 1928.

1,684,297

UNITED STATES PATENT OFFICE.

ELMER E. CARY, OF HOLLYWOOD, CALIFORNIA.

COOKER.

Application filed February 16, 1927. Serial No. 168,761.

My invention relates to cooking utensils and particularly to what is generally termed steam cookers.

One object of my invention is to provide a cooker in which a uniform and relatively high cooking temperature can be maintained with a small amount of heat and which will thus serve to cook food in a rapid and economical manner.

A further object is to provide a cooker in which the parts are so arranged as to practically obviate escape of steam during the cooking operation and in which the steam will be condensed and returned to the boiler or lower part of the cooker without coming in contact with the different foods being cooked in the various compartments.

A still further object is to provide a condenser section for the cooker which is simple in construction and which under normal conditions will effectively condense the steam and thus prevent escape of the same to the atmosphere.

Other objects are to provide a cooker in which the various parts are constructed so as to be easily and readily assembled or disassembled to permit cleaning of the same and which are so shaped as to be easily washed or cleaned after the parts are disassembled.

Other objects and advantages of my improved construction will be apparent from the construction illustrated in the accompanying drawings and described in the following specification.

Referring to the drawings in detail which disclose one embodiment of the invention which is obviously capable of various modifications:

Fig. 1 is a vertical section partly in elevation of my improved cooker, this finger showing several cooking pans in place in the cooker;

Fig. 2 is a vertical section of the lower part of the cooker showing the same arranged for baking;

Fig. 3 is a bottom view of the upper or condenser section of my cooker showing particularly the means employed for locking the condensing plates in the condenser section;

Fig. 4 is a partial sectional view on the line 4—4 of Fig. 3;

Fig. 5 is a perspective view of one of the cooking pans and of the clamps or spacers employed with the same;

Fig. 6 is a perspective view of one of the racks which are adapted to be placed in the bottom of the cooker to support the pans; and Fig. 7 is a perspective view of a plate which it is desirable to use in the cooker during certain operations.

Referring more in detail to the drawings by the reference characters indicated thereon, the numeral 10 indicates what I designate as the boiler or kettle section of the cooker. This section may be made of any height desired, but where it is desired to have a cooker of considerable height, I prefer to employ an extension section 11 which is adapted to closely fit within the section 10. It will be understood that the extension section 11 is in effect part of the boiler section. The extension, of course, need not be employed where not more than one or two cooking pans are used. Arranged above the boiler section of the cooker is a condenser section 12. The condenser section is arranged to tightly fit within the extension 11 or where such extension is not employed, the condenser section may, of course, be fitted directly on the section 10. The sections 10 and 11 are preferably provided respectively with handles $10^a$ and $11^a$ and on top of the condenser section 12, I provide a handle $12^a$. The section 10 is provided near its upper edge with an inwardly projecting rib $10^b$ which forms an internal shoulder in this section for a purpose hereinafter described. The upper edge of the section 10 is preferably beaded as shown at $10^c$. The lower end of the extension 11 is cylindrical as shown at $11^b$ and this cylindrical portion is adapted to tightly fit within the upper end of the section 10. Likewise, the lower edge of the condenser section 12 is provided with a substantially cylindrical portion $12^b$ which is adapted to tightly fit either within the upper end of the extension 11 or the upper end of the section 10.

The condenser section 12 is made up of an outer casing having the top $12^c$ and the side $12^d$, both of which are preferably corrugated so as to provide increased surface to facilitate the action of this section in condensing steam. Secured to the top $12^c$ of the condenser 12 and extending downwardly therein is a bar 13, which is riveted or otherwise rigidly attached to the top $12^c$. Arranged within the condenser 12 is a plurality of condensing plates 14, each of which is provided at its center with an opening or perforation through which the bar 13 extends. The upper plate 14 is provided with a series of studs 14ᵃ which are adapted to space this plate from the top of the condenser. Each plate 14 is also provided on its under side with a bracket 14ᵇ, which serve to space the plates apart. The bar 13 extends through openings in the brackets 14ᵇ. On the bracket 14ᵇ of the lower plate 14, I provide locking means which serves to secure the plates 14 within the condenser section 12. This locking means as illustrated particularly in Figs. 3 and 4 consists of a sliding plate 15 which is adapted to slide beneath ears 16 formed on the lower bracket 14ᵇ. The plate 15 is slotted longitudinally as shown at 17 and the lower end of the bar 13 projects through this slot. The bar 13 has a reduced portion 13ᵃ near its lower end which results in forming a head 13ᵇ on the end of this bar. Part of the slot 17 in the plate 15 is of such size as not to pass over the head 13ᵇ of the bar 13. However, this slot is provided with an enlarged portion 17ᵃ which is of sufficient size to permit passage of the head 13ᵇ on the bar 13. From the foregoing it will be evident that when the plates 14 are assembled in the condenser section 12 and the locking plate 15 shoved in so that the narrow portion of the slot 17 engages the neck 13ᵃ on the bar 13, the parts will be locked in position. Likewise if the locking plate 15 is withdrawn until the enlarged portion 17ᵃ of the slot comes opposite the head 13ᵇ on the bar 13, the condenser plates 14 may be withdrawn from the condenser section.

At its outer edge each of the condenser plates 14 is provided with a downwardly extending flange 14ᶜ, which flanges are positioned in close proximity to the side 12ᵈ of the condenser section. Also each of the plates 14 is preferably transversely curved so that any moisture collecting on these plates will tend to run downwardly and outwardly and drop from the outer edges or flanges 14ᶜ.

The top of the condenser section is provided with a vent 18. The purpose of this vent is to permit the escape of steam from the utensil in case an excess amount of steam is generated. Ordinarily the condenser section will serve to condense all the steam and none will escape. On the contrary, under normal operation, air will tend to pass into the cooker through this vent, thus serving to keep up a supply of oxygen during the cooking operation. However, if too much heat is used and steam is generated in excess, the vent 18 provides means for escape of the same.

One of the important features of novelty of my invention lies in the particular form of cooking pans employed. In cookers of this kind it is important to provide means by which the condensed steam and vapors generated in any one of the cooking pans will not come directly into contact with the foods being cooked in other pans. This prevents intermingling of flavors of different foods. To accomplish this result, I provide pans 20 constructed as illustrated particularly in Figs. 1 and 5. These pans are generally cylindrical in shape, but adjacent their upper edges they are provided with inwardly inclined portions 20ᵃ so that the pans are of less diameter at the top than at the bottom thereof. Also as illustrated particularly in Fig. 1, each of the pans is provided with a bottom 20ᵇ which is so shaped as to gradually incline downwardly and outwardly from the center to the outer margin thereof. In other words, the bottoms of the pans are not flat but are inclined gradually from their centers outwardly. Each of the pans 20 is also preferably provided with a spring clamp 21 which may be snapped over the bead on the upper edge of the pan and which serves as a convenient means by which the pans may be handled. They also serve as means for supporting and spacing the separate pans when they are assembled in the cooker.

By referring to Fig. 1 it will be seen that with a series of pans 20 of the form described, the upper edge of each of the pans lies within the margin of the bottom of the pan above. Likewise, the inner edge of the upper pan lies within the flange 14ᶜ on the lower condenser plate 14. With such an assemblage it will be evident that any vapor arising from one of the lower pans will come in contact with the pan above. After such vapor is condensed it will pass outwardly along the inclined bottom of the pan on which it collects until it passes beyond the upper edge of the pan below. Likewise vapors condensed in the condenser 12 will be carried to the outer edge of this section and beyond the upper edge of the upper pan. The result is that the vapor condensed either on the bottoms of the various pans or in the condenser 12 will pass outwardly to the outer edge of the utensil and will not drop into the pan below but will pass downwardly on the outside of the various pans until it reaches the lower part of the utensil.

In some cases it may be desirable to use a pan having a perforated bottom and one of that kind is illustrated in the bottom in Figure 1.

As a general rule it will be necessary to support the various pans above the bottom of the utensil and for this purpose a bracket 22 may be employed, this bracket being made up of two pivoted sections having depending legs 22ᵃ.

Ordinarily a small amount of water is placed in the bottom of the utensil to furnish the steam for the cooking operation. However, when such articles as meats are to be cooked in the bottom of the utensil, these will supply sufficient vapor and steam for cooking articles in the pans above.

My cooker is readily adapted for baking purposes. In such case a straight sided pan, as illustrated at 23 in Figure 2, may be placed in the bottom of the cooker and a hot stone disk 24 placed above the same, the stone resting on the rim 10$^b$ heretofore mentioned. In such case the condenser section 12 may be placed over the top of the stone and serves to retain the heat to a considerable degree during the baking operation. If desired, a plain metal disk 25 may be substituted for the pan 23 when it is desired to bake certain articles such as biscuits and the like.

Preferably the cooker is placed on a mat or plate 26 having a lining of asbestos or the like so that the heat does not come directly in contact with the metal of the cooker.

With a utensil like that described, it has been found that a number of various foods may be cooked at the same time and that no mingling of the flavors occurs. The utensil is very simple to operate and requires a minimum amount of heat which may be applied from any source. Various changes may, of course, be made in the specific details of the construction without departing from the invention.

Having thus described the invention, what is claimed as new and desired to be secured by Letters Patent is:

1. A steam cooking utensil including in combination, a boiler section, and a condenser section adapted to form a closure for the boiler, said condenser section comprising a casing, a plurality of separate and independent condenser plates arranged in said casing one above the other, a bracket secured beneath each of said plates and resting on top of the plate below, whereby the plates are spaced apart, a rod secured to said casing and extending downwardly through each of said plates and said brackets, and means for detachably securing said plates to said rod.

2. A steam cooking utensil including in combination a boiler section, and a condenser section adapted to form a closure for the boiler, said condenser section comprising a casing having top and side portions, a supporting bar carried by the top portion of said casing and extending downwardly through the same, a plurality of condenser plates arranged in said casing, each having a perforation through which said supporting bar extends, and means for locking said plates on said supporting bar.

3. A steam cooking utensil including in combination, a boiler section, and a condenser section adapted to form a closure for the boiler, said condenser section comprising a casing having top and side portions, a plurality of spaced perforated condenser plates arranged in said casing one above the other, a supporting bar carried by the top portion of said casing and extending downwardly through the perforations in said plates, and a locking device engaging said bar below said plates for locking said plates in the casing.

4. A condensing section for a steam cooking utensil comprising a casing having top and side portions provided with corrugations, a plurality of circular upwardly curved condenser plates arranged in said casing, the edges of said plates being arranged in close proximity to the side of said casing, a supporting bar extending from the top of said casing downwardly through said plates, and means engaging said bar for locking said plates in the casing.

5. A condensing section for a steam cooking utensil comprising a casing having top and side portions, a plurality of circular condenser plates arranged in said casing, each of said plates having a downwardly turned flange at its edge arranged in close proximity to the side of said casing, means for spacing the upper one of said plates from the top of said casing, means for spacing said plates from each other, a bar extending from the top of said casing downwardly through said plates, and means for detachably locking said plates on said bar.

6. A cooking utensil comprising a boiler section, a condensing section adapted to form a cover for said boiler section and a plurality of cooking pans adapted to be arranged in said boiler section below said condensing section, each pan having an imperforate bottom and each being of less diameter at the top than at the bottom thereof, and each pan having its bottom inclined downwardly and outwardly from the center to the margin thereof and the lower surface of said bottom being unobstructed, whereby moisture condensed on the bottom of one pan will flow outwardly beyond the upper edge of the pan below and fall outside the latter, and means in said condensing section to cause moisture condensed therein to descend outside of the upper edge of the pan directly below said condensing section.

7. For use in a steam cooking utensil, a plurality of cooking pans, adapted to be placed one above the other, the diameter of the top of each of said pans being less than the bottom thereof, and the bottom of each of said pans being imperforate and inclined downwardly and outwardly from the center to the margin thereof and the lower surface of said bottom being unobstructed, whereby moisture condensed on the bottom of one pan will flow outwardly beyond the upper edge of the pan below and fall outside of the latter.

8. A steam cooking utensil including a boiler, a plurality of superposed cooking pans arranged above said boiler, a condenser above said cooking pans, each of said pans having an imperforate bottom and an open top, whereby vapor generated in said pans will be free to escape therefrom, each of said pans being of greater diameter at its bottom than at the top thereof, the bottom of each pan being inclined downwardly and outwardly from the center to the margin thereof, whereby vapor condensed on the bottom of any pan will be conducted outwardly beyond the upper edge of the pan below, and means in said condenser for conducting condensed liquid outwardly beyond the upper edge of the pans below the condenser.

9. A steam cooking utensil including in combination, a boiler section, and a condenser section adapted to form a closure for the utensil, said condenser section comprising a casing, a plurality of separate and independent condenser plates arranged in said casing one above the other, a bracket secured beneath each of said plates and engaging the top of the plate below, a rod secured to said casing and extending downwardly through each of said plates and said brackets, said rod also extending downwardly through the bracket on the lowermost plate, and a latch carried by said lowermost plate for engaging the lower end of said rod whereby all of said plates are detachably secured to said casing.

10. A cooking utensil comprising in combination, a boiler section, an extension section and a condenser section, a plurality of pans adapted to be placed one above the other in said boiler section and extension, each of said pans being of less diameter at the top than at the bottom thereof, and the bottom of each pan being imperforate and inclined outwardly and downwardly from the center toward the margin thereof and the lower surface of the bottom being unobstructed, whereby condensed vapors may flow down the under surface of said inclined bottom beyond the upper edge of the pan below, said condenser section including a plurality of separate and independent condenser plates and a single means for detachably locking said plates in said condenser section.

In testimony whereof I hereunto affix my signature.

ELMER E. CARY.